UNITED STATES PATENT OFFICE.

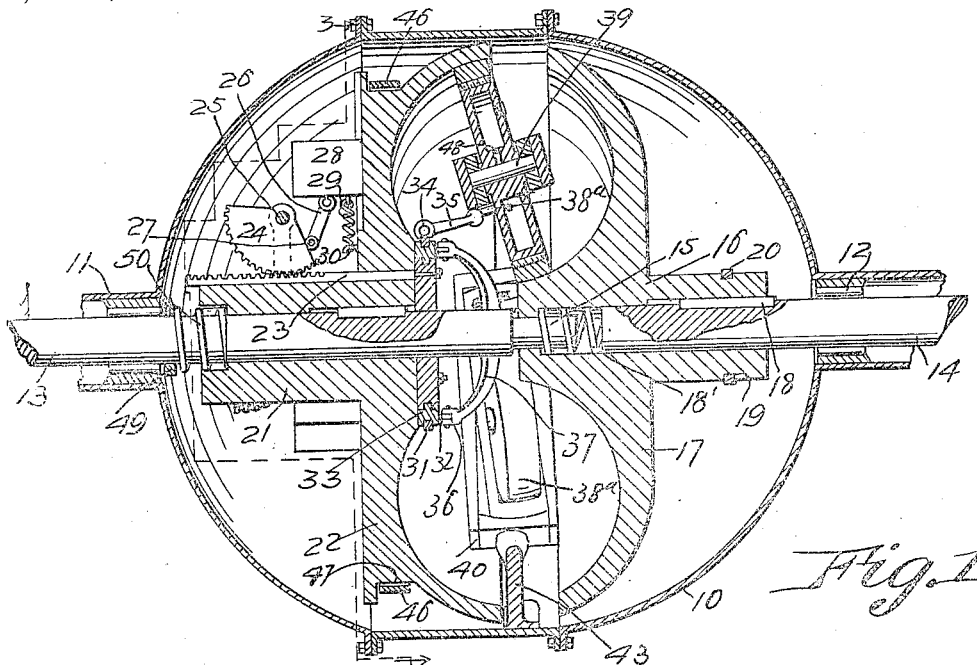
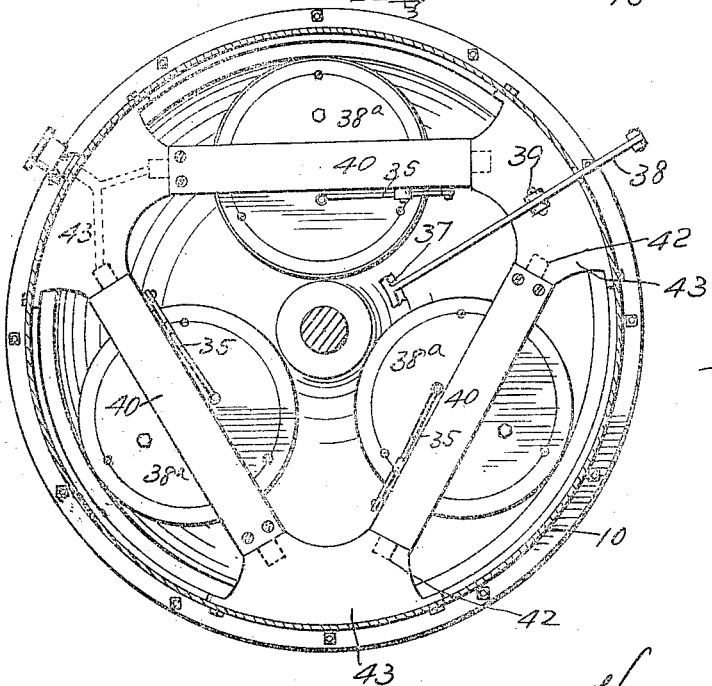

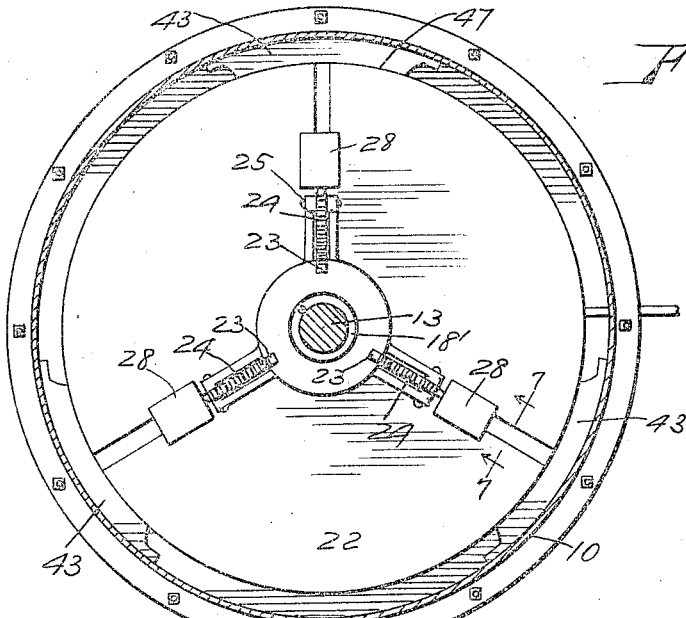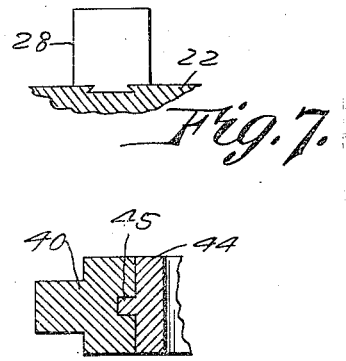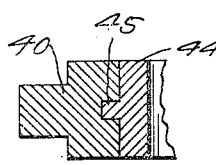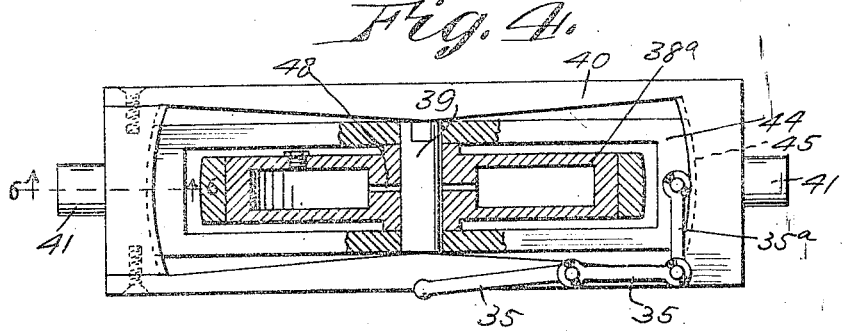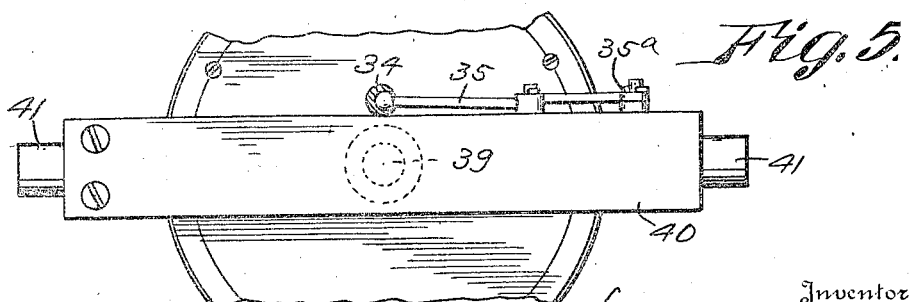

HARRY GLENN BARNES, OF GILMAN, MONTANA, ASSIGNOR OF ONE-HALF TO RODERICK McCLURE, OF GILMAN, MONTANA.

POWER-TRANSMITTING DEVICE.

1,175,677.  Specification of Letters Patent.  Patented Mar. 14, 1916.

Application filed October 24, 1914. Serial No. 868,498.

*To all whom it may concern:*

Be it known that I, HARRY G. BARNES, a citizen of the United States of America, and resident of Gilman, in the county of Lewis and Clark, and State of Montana, have invented certain new and useful Improvements in Power-Transmitting Devices, of which the following is a specification.

This invention relates to clutches or power transmitting means, the said invention being more particularly adapted for use in transmitting power from one shaft to another or from one part of a mechanical device to another, means being provided for varying the speed while at the same time effecting the driving of mechanism without the loss of power and by mechanism having a minimum friction which is practically noiseless.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a vertical sectional view of a power transmitting medium embodying the invention; Fig. 2 illustrates a view in elevation of the interior of the mechanism with one section of the transmitting means omitted; Fig. 3 illustrates a sectional view on a line corresponding with the line 3—3 of Fig. 1; Fig. 4 illustrates a sectional view of one of the friction wheels and its bearing frame; Fig. 5 illustrates a side elevation thereof; Fig. 6 illustrates a detail sectional view on the line 6—6 of Fig. 4; and Fig. 7 illustrates a sectional view on the line 7—7 of Fig. 3.

In these drawings 10 denotes a casing having roller bearings or other anti-friction bearings 11 and 12, one of which is for the shaft 13 and the other of which is for the shaft 14. The shaft 13 has a reduced end 15 which extends into the hub 16 of a cone 17, and the said reduced end is embraced by a spring 18, which spring bears against the end of the shaft 14, which shaft 14 also extends into the hub of the cone and is fastened thereto by a key 18. While I have described the fastening as a key, any appropriate means may be provided for securing the hub to the shaft. The cone 17 is slidable on the shaft 14 and it has a recess 19 for the fork 20 of a lever which may be manipulated for moving the cone with respect to the cone engaging wheels, to be presently explained.

The shaft 13 has the hub 21 of the cone 22 mounted on it and the said hub has racks 23 mounted to slide longitudinally thereof the teeth of each rack being engaged by a toothed segment 24, each mounted on a shaft 25. The toothed segment has a link 26 pivotally connected to it as at 27 and the said link is further pivotally connected to a weight 28 which is dove-tailed into the slot of the cone 22 and is slidable thereon under the influence of centrifugal force and a spring 29, which spring has one end anchored to a stud 30 and its opposite end secured to the weight, so that the said spring normally draws the weight inwardly. When the cone 22, however, is rotating rapidly, centrifugal force overcomes the action of the spring and the said weight travels outwardly and communicates motion to the toothed segment through the link connection heretofore described, thus reciprocating the rack for a purpose to be presently explained.

While I have described the weight and its associated parts in the singular, it is to be understood that these parts are duplicated in transmitting apparatus according to the requirements in practice and I have here shown three friction wheels, each of which is controlled by a weight and spring and parts associated therewith.

The inner ends of the racks are connected to a collar 31, which slides on the shaft 13 and the said collar is grooved to receive the flange 32 of the ring 33, the ring 33 in turn being provided with ears 34 to which the levers 35 are pivoted, and ears 36 to which a yoke 37 is connected, the said yoke being a part of a lever 38, which lever is mounted on the pivot 39 and being under the control of the operator so that the collar 31 may be slid longitudinally of the shaft 13.

The friction wheels 38ª which operate in conjunction with the cones, are mounted on shafts 39, the said shafts extending transversely of a frame 40 having trunnions 41 on each end and the trunnions are mounted in the sockets 42 of brackets 43 carried by the casing, and, as shown in the drawings, these trunnions permit the oscillation of the wheel or wheels over the surfaces of the cones to increase or diminish the speed of the running parts. The wheels are oscillated by reason of the fact that the levers 35 are pivotally connected to the frames through the links 35ª, and as the collar moves longitudinally of the shaft, either under the influence of the weights and springs or the influence of the lever, the speed of the transmitting parts may be regulated. In addition to the frame 40 there is a frame 44 through which the shaft 39 on which the wheel is mounted extends and the frame 44 is provided with a tongue 45 slidable in the frame 40 so that the frame 44 has a slight movement independently of the frame 40 and the angle of adjustment of the wheels with relation to the cones is effected to insure proper traction of the wheels with respect to the cones. The brake band 46 is adapted to bear against the shoulder 47 constituting the brake surface of the cone 22, the said brake band being drawn on the shoulder by mechanism, not shown.

The wheels 38ª have oil ducts 48 in their hubs and the said wheels are hollow and are adapted to contain lubricant which will find its way through the oil duct to the bearing surfaces of the wheel and its shaft.

The shaft 13 has a collar 49 which may be secured at different positions of adjustment thereon and the said collar bears against a spring 50 to adjust it to increase or diminish its tension according to its adjustment with respect to the hub 21 of the cone.

I claim—

1. In a power transmitting device, a casing, shafts, each having an end extending into the casing, a cone mounted on each shaft within the casing, the cones being in proximity to each other, wheels engaging the surfaces of the cones, frames trunnioned to oscillate with relation to the cones, means for mounting the wheels on said trunnions, a collar slidable on one of the shafts, means for communicating the motion of the collar to the frames of the wheels, racks slidable longitudinally of the shafts and connected to the collars, segments oscillatably mounted in the casing and having teeth engaging the teeth of the racks, weights slidable radially of the cone and having a dove-tailed connection therewith, means for communicating the motion of the weights to the segments, and means for normally drawing the weights inwardly.

2. In a power transmitting device, oppositely spaced cones, a shaft on which each cone is mounted, wheels engaging the surfaces of the cones, frames in which the wheels are rotatably mounted, means for oscillatingly mounting the frames, a frame within each of the last mentioned frames, the inner frame having sliding relation to the outer frame, means for communicating motion to the frames for changing the relation of the wheels to the cones, and means actuated by centrifugal force for adjusting the position of the frame actuating means.

3. In a power transmitting device, two shafts, a cone clutch member on each shaft, partially rotatable frames, frames slidable within the rotatable frames, shafts supported by the pairs of frames, wheels mounted on the shafts, said wheels engaging the surfaces of the cone clutch members, means for moving the frames whereby the position of the wheels with relation to the cone clutch members is adjusted, and members for operating the frame moving means.

4. In a power transmitting device, two shafts, a cone clutch member on each shaft, partially rotatable frames, frames slidable within the rotatable frames, shafts supported by the pairs of frames, wheels mounted on the shafts, said wheels engaging the surfaces of the cone clutch members, means for moving the frames whereby the position of the wheels with relation to the cone clutch members is adjusted, members for operating the frame moving means, and means whereby centrifugal force controls the position of the said members.

In testimony whereof, I hereunto affix my signature in the presence of two witnesses.

HARRY GLENN BARNES.

Witnesses:
O. A. MILLER,
A. L. BRADLEY.